Patented June 10, 1947

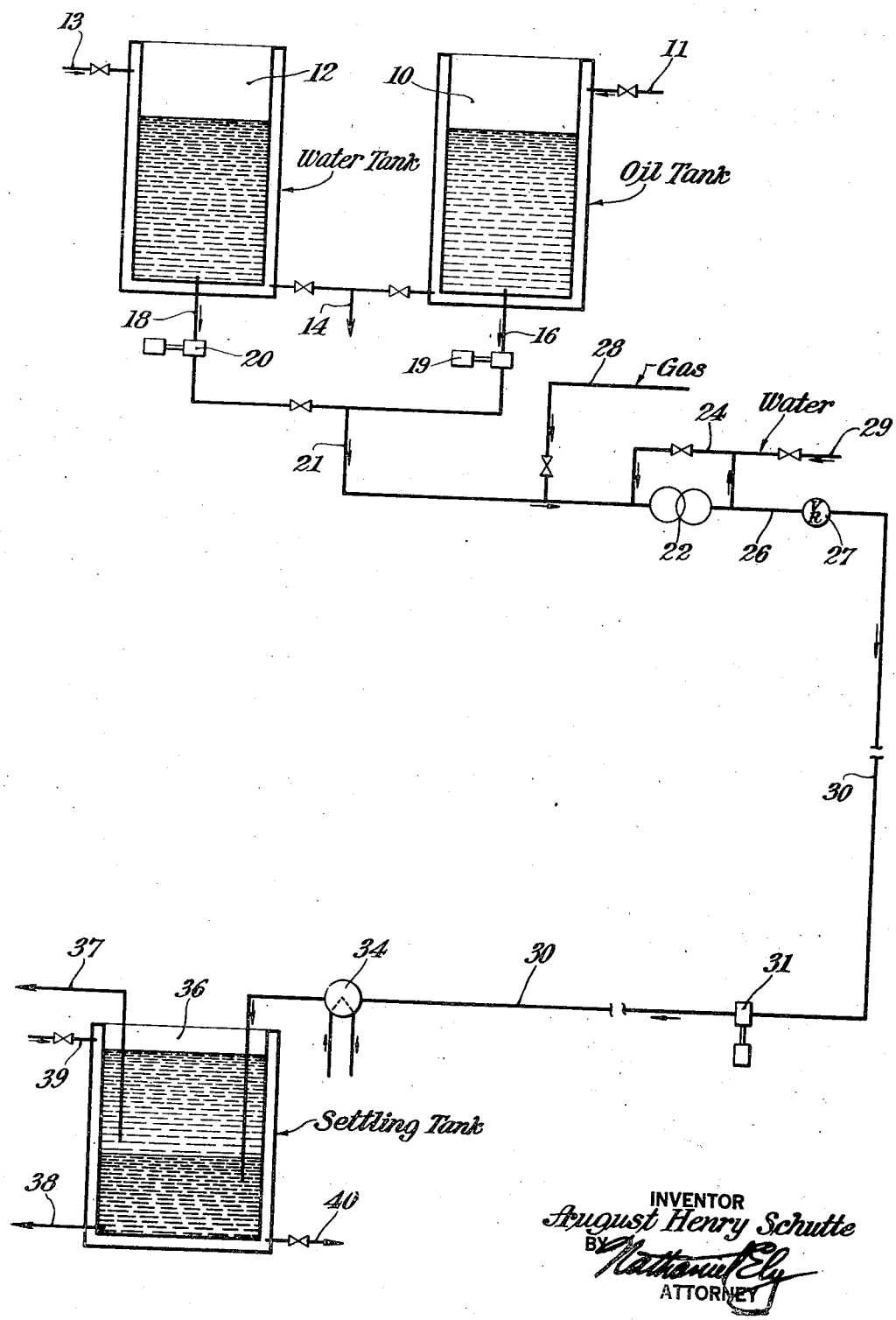

2,421,968

UNITED STATES PATENT OFFICE 2,421,968

METHOD OF CONVEYING FLUIDS

August Henry Schutte, Hastings on Hudson, N. Y., assignor to The Lummus Company, New York, N. Y., a corporation of Delaware Application August 30, 1941, Serial No. 409,027

3 Claims. (Cl. 196—17)

This invention relates to a method of conveying or transporting high melting point materials such as high pour point oils and waxes. It is a continuation-in-part of the invention disclosed in my prior patent, No. 2,168,306, issued August 1, 1939, and in my copending application, S. N. 258,527, filed February 25, 1939.

The primary object of this invention is to place a high melting point material in such a condition that it may be readily pumped through a pipe line over a substantial distance and in considerable volume. To such ends, the high melting point material such as a high pour point oil or wax is emulsified with a non-solvent, non-reactive liquid and/or an inert, non-solvent gas such as water and air, respectively, to form an exterior water-phase emulsion that can be handled by normal pumping means without building up of excessive pressures.

It is obvious that high melting point, normally solid hydrocarbon materials such as high pour point oils and waxes cannot be piped or transported through conduits unless the entire apparatus is heat-jacketed; and, even when such provision is made, the pressure requirements are increased to such a degree that the rate of discharge is low. If at any time the conduits should become cooled, the entire mass of hydrocarbon material solidifies with the result that thawing out of the solidified mass is necessary; such procedure is prohibitively expensive and substantially impracticable with long lines.

In accordance with the teaching of my present invention, high melting point, normally solid oils or waxes or other solid materials such as naphthalene or other crystalline materials are liquefied and thereafter transformed into an emulsion by passage through a suitable emulsifying device such as a homogenizer, a colloid mill, a rotary gear pump, or the like in admixture with a suitable quantity of a non-solvent, non-reactive liquid such as water and/or an inert, non-solvent gas such as air to form a substantially stable emulsion. As a specific example, a high pour point oil is preferably emulsified with water and air to form an oil-in-water-phase emulsion. Such an emulsion is readily pumped through a conduit at temperatures below the pour point of the oil, and the use of a heat-jacketed pipe for carrying the oil is thereby avoided. The oil or wax may be separated from the water phase of the emulsion at the discharge end of the conduit as by settling in a tank or in an apparatus such as a centrifugal separator.

A further important advantage of the present method is that salts and other impurities present in the oil or the wax may be readily separated out along with the water phase of the emulsion if, for example, the latter is allowed to settle into layers in a suitable tank placed at the terminus of the pipe line. It will be appreciated that this simplified method of desalting oils is particularly advantageous in the preparation of cracking stocks, the presence of salt in which is highly undesirable.

Further objects and advantages of my invention will be apparent from the accompanying drawing, which is a schematic layout of one form of apparatus that can be successfully used in carrying out the present method, although it will be understood that this method of preparing waxes and high pour point oils for pumping through conduits such as pipe lines is not limited to this particular apparatus. For convenience, my invention will be described as applied to the handling of a high pour point oil.

As more particularly described in my prior patent and application above referred to, an emulsion of a high pour point oil may be formed with a suitable non-solvent, non-reactive liquid, preferably water. As shown in the accompanying drawing, the high pour point oil is stored in a suitably jacketed tank 10, into the jacket of which a heating medium such as steam is introduced as from line 11 for the purpose of maintaining the oil in a fluid state and at the desired temperature. A supply of water or some other non-solvent, non-reactive liquid may be conveniently maintained in a similar tank 12, which is also provided with a jacket to receive steam as from line 13. Condensate from the jackets of tanks 10 and 12 may be conveniently removed through line 14.

In accordance with the preferred form of embodiment of my invention, the oil is withdrawn in the desired proportioned amount from tank 10 as through line 16 and is discharged as by means of pump 19 into manifold 21. Similarly, water to be emulsified with the oil may be withdrawn from tank 12 through valved line 18 and may also be discharged into manifold 21 as by means of pump 20. Manifold 21 feeds the oil and the water to the emulsifying device 22, wherein the desired emulsion of the oil with the water is formed. This emulsifying device may be any suitable type, but I find that in many cases a rotary gear pump or the like is highly satisfactory. In such case the emulsifying device or mixer 22 is preferably provided with a bypass 24 so that adequate emulsification of the mixture can be obtained by continuous recirculation of a portion thereof. The resulting emulsified mixture is discharged into line 26, which is provided with a relief valve 27 set at a predetermined pressure to assure the formation of the desired emulsion by sufficient recirculation of the mixture undergoing emulsification through device 22.

Preferably air or some other suitable inert gas is introduced through line 28 into manifold 21, for the use of such a gas produces a superior type of emulsion that can be more readily handled. In addition, in order to control the temperature and the characteristics of the resulting emulsion, I find that it is desirable to introduce a cooling medium such as the non-solvent, non-reactive liquid in cooled condition, which in this case is cold water, directly into the recirculated emulsion as at 29, in accordance with the procedure more completely described in my patent, No. 2,254,049, dated August 26, 1941. By the introduction of cooling water in this manner, I am able to discharge the emulsion into line 26 at any predetermined temperature, which will generally be below the pour point of the oil. The temperature selected will, of course, be determined by the atmospheric conditions of the particular locality.

At least a portion of the cooling water introduced at 29 under sufficient pressure enters into the oil-water emulsion that is formed in the emulsifying device 22. It will thus be appreciated that all or only a part of the water that goes into the emulsion can be introduced into the system through line 29. I find, however, that it is preferable and most convenient from an operating viewpoint to introduce all the water for emulsification purposes through line 29. In this manner tank 12 can be dispensed with. The remainder of the cooling water introduced at 29 serves to remove the heat of emulsification and to chill the resulting emulsion so that at least the higher melting point portion thereof solidifies as described in my above-mentioned patent.

The proportion of water to oil is, of course, determined by the conditions present in any particular case. Governing factors include the temperature of the available water, the characteristics of the oil being emulsified, and the prevailing atmospheric conditions. The amount of air utilized is relatively small and is generally considerably less than the amount of water.

I find that the resulting emulsion is readily pumpable even though the temperature thereof drops materially as the emulsion flows through the pipe line. This condition results from the fact that cooling acts to stabilize the emulsion. The distance through which the emulsion can be pumped is limited only by the pressure drop encountered in the particular pipe line. At distances of many miles it may be found desirable to use one or more booster pumps as generally indicated at 31, which may be either of the centrifugal type or of the positive displacement type. It is contemplated that emulsions of this character can thus be pumped for a considerable distance through a line such as indicated at 30 without excessive power requirements and without steam-jacketing of such a line and without danger of solidification of the emulsified material therein.

Separation of the emulsion into its components at the end of the line is readily accomplished by heating the emulsion as in heat exchanger 34 and then discharging the heated emulsion into a receiving or settling tank generally indicated at 36. The heating serves to break the emulsion so that it can be readily separated. Preferably the heated emulsion is discharged into tank 36 at such a point that it will quickly stratify into a relatively light oil layer which is drawn off through pipe 37 and a relatively heavy water layer which is drawn off through line 38. Tank 36 may also be provided with a jacket, through which steam or the like may be circulated as by means of lines 39 and 40 to maintain the materials in the tank in liquid condition and at the desired temperature. It will be appreciated that a centrifugal separator can be used in place of the settling tank or in addition thereto.

Salts and other impurities or undesired materials present in the oil can also be separated from the oil together with the water used for emulsification. Those impurities such as inorganic matters which are insoluble become concentrated at the interface between the water and the oil layers, and those impurities such as salts and the like which are soluble dissolve in the water layer. Such impurities can be conveniently removed along with the water layer for suitable disposal. It appears that the emulsification procedure causes these impurities to separate out from the oil and to accumulate in the water layer. A similar result is obtained when a centrifugal separator is employed.

As an example of the application of my invention to the pumping of high pour point oils, I have emulsified a 90° F. pour point pressable distillate with water and air and have successfully pumped the resulting emulsion through a considerable length of pipe at a temperature of approximately 50° F., which is materially below the pour point of the oil. My invention, however, is also applicable to the pumping of high pour point crude oils and other relatively high pour point oil fractions.

My process has also been successfully applied to the pumping of waxes such as slack wax and the like. I have been able to pump an emulsion of a crude scale wax having a melting point of 127° F. and water at a temperature of approximately 115° F. without plugging of the pipe line by solidification of the wax.

In accordance with the teachings of this invention, relatively high melting or pour point, normally solid, organic materials heretofore normally unpumpable or difficultly pumpable at normal atmospheric temperatures through pipes or conduits may be easily and economically conveyed over considerable distances with conventional pumping equipment. The additional water or the like that makes up the water phase of the emulsion does not reduce the total volume of difficultly pumpable material handled, inasmuch as the conversion of such material into an emulsion permits a substantial increase in the pumping rate with an ultimate volume of material pumped far in excess of that obtainable by pumping of such material in an unemulsified condition. The use of air or the like in conjunction with the water is generally preferable since it provides an emulsion that can be more readily handled. It will be understood that the applicability of my invention is limited only by the melting or pour point of the particular material to be pumped and by the availability of a suitable non-solvent, non-reactive liquid having a boiling point sufficiently high.

In certain cases it may be desirable to employ an emulsifying agent to assist in the formation of the oil-water emulsion. If such procedure is followed, any of the various well known emulsifying agents inert with respect to the oil may be used in connection with the water and/or the air.

Although I have shown a preferred manner of carrying out my invention, it will be appreciated that modifications may be made thereto; therefore, only such limitations as appear in the claims appended hereinafter should be included.

What I claim is:

1. The method of rendering a high melting point, normally solid wax containing hydrocarbon material transportable at a temperature below its melting point and transporting such hydrocarbon material to a distant point through a supply pipe line for such material of the order of miles in length, which comprises liquefying such material, emulsifying the liquefied material with water and air, cooling the resulting emulsion to a pumping temperature below the melting point of such material to solidify at least a portion of such hydrocarbon material and thereby stabilize the emulsion, pumping the so-cooled and stabilized emulsion through the pipe line to the distant point, and thereafter separating the water from the hydrocarbon material.

2. The method of rendering a high melting point, normally solid crystalline hydrocarbon material transportable at a temperature below its melting point and transporting such hydrocarbon material to a distant point through a supply pipe line for such material of the order of miles in length, which comprises liquefying such material, emulsifying the liquefied material with water and air, cooling the resulting emulsion to a pumping temperature below the melting point of such material to solidify at least a portion of such hydrocarbon material and thereby stabilize the emulsion, pumping the so-cooled and stabilized emulsion through the pipe line to the distant point, and thereafter separating the water from the hydrocarbon material.

3. The method of rendering a high melting point, normally solid wax containing hydrocarbon material transportable at a temperature below its melting point and transporting such hydrocarbon material to a distant point through a supply pipe line for such material of the order of miles in length, which comprises liquefying such material, emulsifying the liquefied material with water and air, cooling the resulting emulsion to a pumping temperature below the melting point of such material to solidify at least a portion of such hydrocarbon material and thereby stabilize the emulsion, pumping the so-cooled and stabilized emulsion through the pipe line to the distant point, then heating the emulsion to a temperature above the melting point of such material to effect a breaking of such emulsion, and thereafter separating the water from the hydrocarbon material.

AUGUST HENRY SCHUTTE.

REFERENCES CITED

The following references are of record in the file of this patent:

UNITED STATES PATENTS

| Number | Name | Date |
| --- | --- | --- |
| 194,275 | Turner | Aug. 14, 1877 |
| 278,844 | Arendt et al. | June 5, 1883 |
| 1,008,980 | Mills | Nov. 14, 1911 |
| 1,454,485 | Persch | May 8, 1923 |
| 1,514,118 | Wright | Nov. 4, 1924 |
| 2,168,306 | Schutte | Aug. 1, 1939 |
| 2,263,535 | Carr et al. | Nov. 18, 1941 |
| 2,042,428 | Krekeler | May 26, 1936 |
| 2,119,538 | Hampton | June 7, 1938 |
| 1,787,338 | Clapp | Dec. 30, 1930 |
| 1,940,431 | Neitzke | Dec. 19, 1933 |
| 2,128,913 | Burk | Sept. 6, 1938 |